No. 768,780. Patented August 30, 1904.

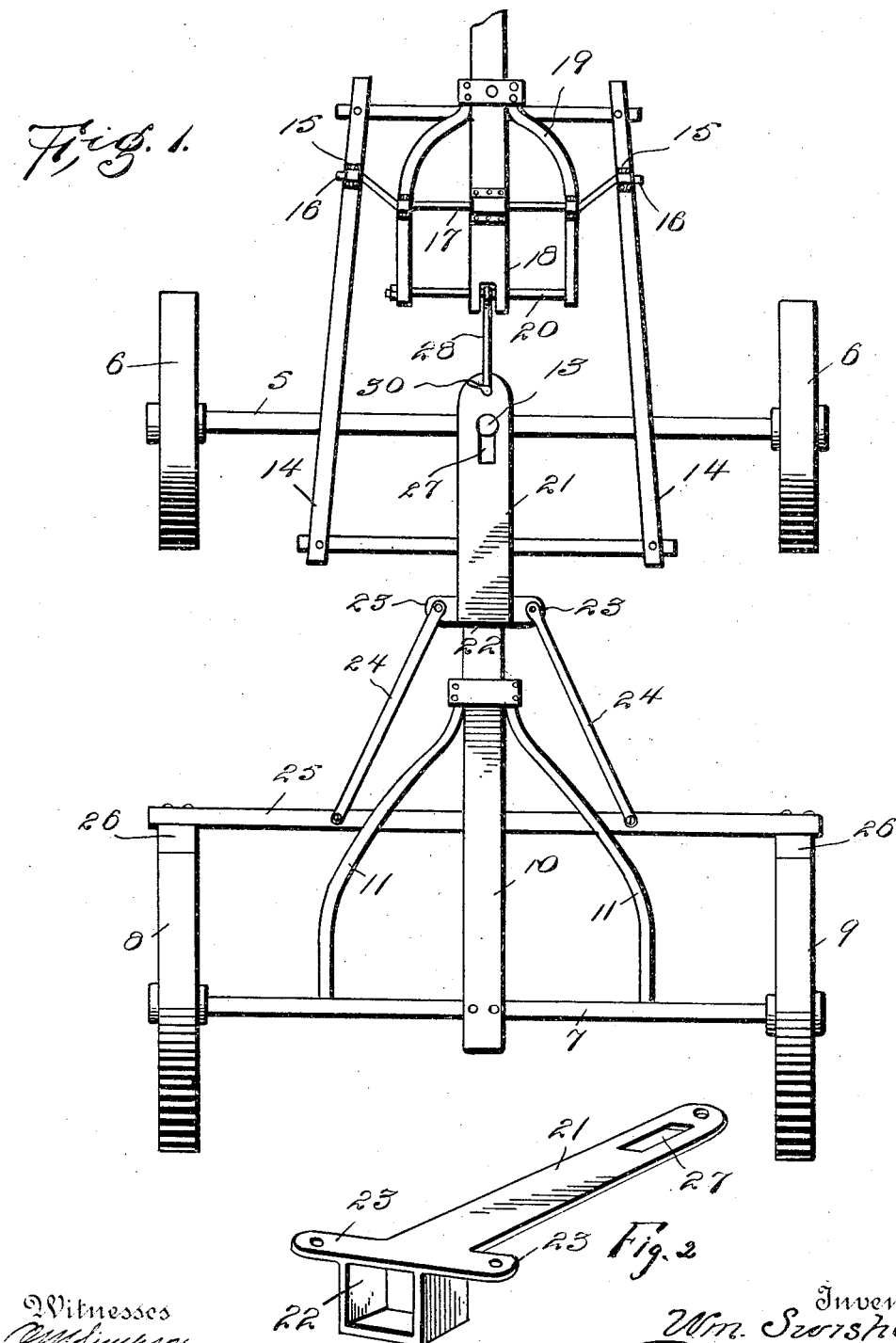

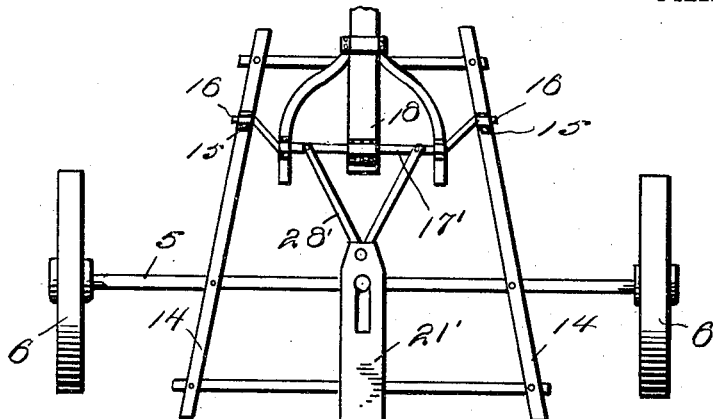
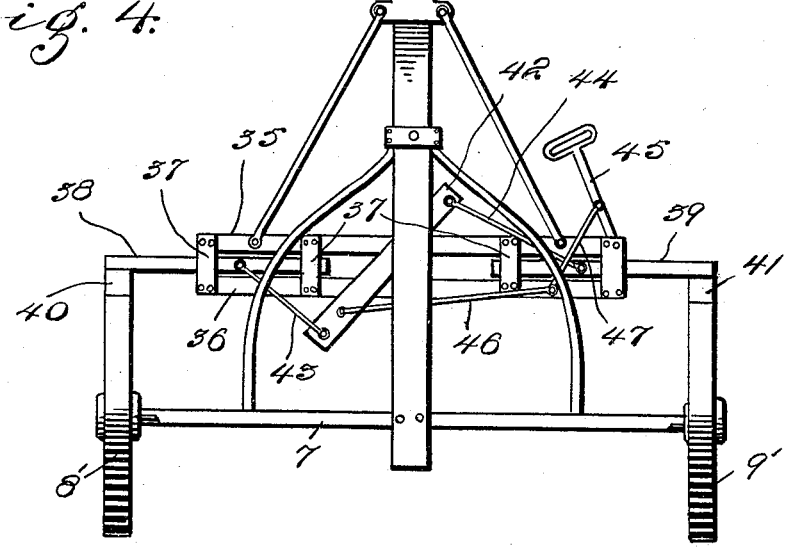
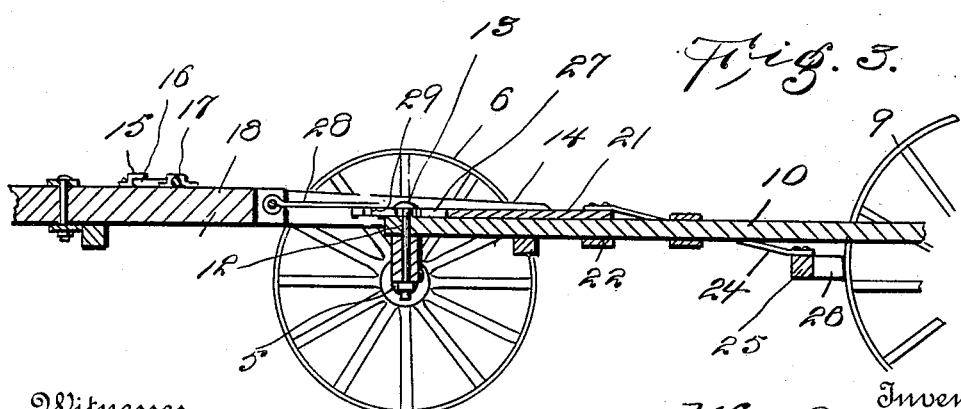

UNITED STATES PATENT OFFICE.

WILLIAM SWISHER, OF DANVILLE, ILLINOIS.

VEHICLE-BRAKE.

SPECIFICATION forming part of Letters Patent No. 768,780, dated August 30, 1904.

Application filed November 13, 1903. Serial No. 181,082. (No model.)

*To all whom it may concern:*

Be it known that I, WILLIAM SWISHER, a citizen of the United States, residing at Danville, in the county of Vermilion, State of Illinois, have invented certain new and useful Improvements in Vehicle-Brakes; and I do hereby declare the following to be a full, clear, and exact description of the invention, such as will enable others skilled in the art to which it appertains to make and use the same.

This invention relates to vehicle-brakes applicable generally to heavy wagons, one object being to provide a construction and arrangement whereby the brake may be applied automatically upon the descent of an incline or hill and released when the bottom is reached, the arrangement being such that the brakes will be automatically applied on a level roadbed in the event the horses hold back for any purpose.

Another object of the invention resides in the provision of a simple, inexpensive, durable, and efficient brake of the above-named variety, the different parts being easily and quickly assembled.

With these and other objects in view the invention consists also in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the present invention.

In the drawings, Figure 1 is a top plan view of a running-gear, showing the brake-beam and its shoes applied to the rear wheels. Fig. 2 is a detail perspective view of the sliding plate and its collar. Fig. 3 is a vertical section taken longitudinally through the rear end portion of the tongue and a portion of the reach-bar and adjacent parts. Fig. 4 is a view similar to Fig. 1, showing a second embodiment of the invention.

Referring now to the drawings, and more particularly to Figs. 1, 2, and 3 thereof, there is shown a running-gear comprising a front axle 5, having wheels 6, a rear axle 7, having wheels 8 and 9, and a reach-bar 10, which is engaged with the rear hounds 11 and the rear axle in the usual manner and which at its forward end is provided with a vertical perforation 12, through which is passed a kingbolt 13, that connects the reach-bar with the front axle. The reach-bar is pivotally movable on this king-bolt. Connected to the front axle are the front hounds 14, having bearings 15, in which are received the ends of a rockshaft 16, the central portion of which is displaced forwardly to form a crank portion 17, and with this crank portion is connected the tongue 18, as also the ends of the U-shaped brace 19, which is connected with the tongue. Connecting the rear ends of the U-shaped brace and the tongue is a tie-rod 20. Disposed upon the forward end of the reach-bar 10 is a plate 21, having a collar 22 at its rear end which encircles the reach-bar and has laterally-directed ears 23, with which are connected rods 24, that diverge rearwardly and are attached to a brake-beam 25, provided with shoes 26 in position for engagement with the wheels 8 when said beam is moved rearwardly. In the plate 21 is a longitudinal slot 27, through which the king-bolt 13 is passed and with respect to which bolt said plate is longitudinally movable. A latch 28 is pivoted to the rear end of the tongue 18 and is movable into and out of engagement with a perforation 29 in the forward end of the plate 21, said latch having a handle 30, which may be grasped to facilitate engagement and disengagement of the latch.

With the construction described it will be understood that the tongue 18 is movable longitudinally with respect to the front axle 5 and that when the draft-animals back they move the tongue rearwardly, so that the plate 21 is slid rearwardly by the latch 28, and the brake-beam 25 is correspondingly moved, so that the shoes 26 are pressed against the wheels 8 and 9. When the draft-animals move forwardly, the tongue pulls the latch 28, which moves the plate 21 forwardly, carrying the brake-beam, with its shoes, out of engagement with the wheels 8 and 9. This longitudinal movement or lost motion of the tongue with respect to the running-gear is permitted by reason of the rock-shaft having the crank 17, with which the tongue is connected, said shaft being rocked forwardly and then rearwardly, as will be understood. When it is desired to back without setting the brakes, the latch 28 or link is disengaged from the perforation 29.

In the construction shown in Fig. 4 of the drawings the plate 21', corresponding to the plate 21 in Fig. 1, is connected to the crank 17' by means of the forwardly-diverging links 28', which are permanently connected with the plate 21', so that as the crank is swung the plate 21' is reciprocated. The other portions of the mechanism are the same as above described with the exception of the brake-beam, which comprises a body portion, including spaced members 35 and 36, which are connected by the cross-plates 37, and between these members are slidably mounted the end members 38 and 39, which carry the brake-blocks 40 and 41, respectively. A rocker 42 is pivoted upon the member 35 and is connected at its ends to the members 38 and 39, respectively, by the rods 43 and 44. A hand-lever 45 is pivoted to the member 35 and is connected to the rocker 42 by means of the rods 46 and 47, so that as the hand-lever 45 is rocked the members 38 and 39 are reciprocated to carry the brake-blocks 40 and 41 into and out of position for engagement with the wheels 8' and 9' when the brake mechanism is operated. When the vehicle is to be backed, the lever 45 is shifted to carry the brake-blocks out of position for engagement with the wheel.

What is claimed is—

1. In an automatic brake for vehicles, the combination with a running-gear including a reach-bar, front and rear hounds, axles and wheels, of a shaft journaled upon the front hounds the central portion of said shaft being bent to form a crank, a tongue pivotally connected with said crank and movable longitudinally of the hounds to rock the shaft, a plate disposed upon the reach-bar and having a collar slidably engaged with the latter, connections between said plate and tongue for movement of the plate with the tongue, a brake-beam and connections between the beam and the sliding plate for movement of the brake-beam with the tongue.

2. In an automatic brake for vehicles, the combination with a running-gear including a reach-bar, front and rear hounds, axles and wheels, of a rocking shaft mounted upon the front hounds and having a crank, a tongue connected with said crank and movable therewith longitudinally upon the hounds, a brake-beam comprising a body portion, longitudinally-slidable end portions connected with the body portion and provided with brake-blocks, means for shifting the end members into and out of position for contact with adjacent wheels, and connections between the brake-beam and the tongue, said beam being movable with the tongue to carry the brake-blocks into and out of engagement with the wheels.

In testimony whereof I affix my signature in presence of two witnesses.

WILLIAM SWISHER.

Witnesses:
ENOCH VANSICKLE,
W. P. HOLADAY.